US006891693B2

(12) United States Patent
Shibata (10) Patent No.: US 6,891,693 B2
(45) Date of Patent: May 10, 2005

(54) APPARATUS AND METHOD FOR HEAD POSITIONING CONTROL IN DISK DRIVE

(75) Inventor: Satoshi Shibata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 442 days.

(21) Appl. No.: 10/059,156

(22) Filed: Jan. 31, 2002

(65) Prior Publication Data

US 2002/0126412 A1 Sep. 12, 2002

(30) Foreign Application Priority Data

Jan. 31, 2001 (JP) ........................................ 2001-024475

(51) Int. Cl.$^7$ ............................................. G11B 5/596
(52) U.S. Cl. ............................... 360/77.04; 360/77.04; 360/78.04
(58) Field of Search ........................... 360/77.04, 77.02, 360/78.04

(56) References Cited

U.S. PATENT DOCUMENTS 6,002,540 A 12/1999 Cunningham et al.

FOREIGN PATENT DOCUMENTS

JP 11-39814 2/1999

OTHER PUBLICATIONS

U.S. patent application Ser. No. 09/115,592, Yatsu, filed Jul. 15, 1998.

Primary Examiner—Andrew L. Sniezek
Assistant Examiner—Mitchell Slavitt
(74) Attorney, Agent, or Firm—Pillsbury Winthrop LLP (57) ABSTRACT

A memory section stores values of the runout component, which are obtained in respective predetermined radial positions on the disk. A determining section selects, from the memory section, a value of the runout component corresponding to a target position. A runout detector uses, as an initial value for adaptive learning, the value of the runout component selected by the determining section, and calculates, by the adaptive learning, a value of the runout component contained in a position error between a head position and the target position. A feedforward controller calculates a feedforward value used to suppress the runout component calculated by the runout detector. A feedback controller calculates a feedback value from the position error. An adder generates, from the feedback value and the feedforward value, a control amount used to position the head in the target position.

17 Claims, 8 Drawing Sheets

| HEAD NUMBER | ZONE NUMBER | INITIAL VALUE |
|---|---|---|
| 0 | 0 | |
| | 1 | |
| | 2 | |
| | 3 | |
| 1 | 0 | |
| | 1 | |
| | 2 | |
| | 3 | |
| 3 | 0 | |
| | 1 | |
| | 2 | |
| | 3 | |

APPARATUS AND METHOD FOR HEAD POSITIONING CONTROL IN DISK DRIVE

CROSS-REFERENCE TO RELATED APPLICATIONS

This application is based upon and claims the benefit of priority from the prior Japanese Patent Application No. 2001-024475, filed Jan. 31, 2001, the entire contents of which are incorporated herein by reference.

BACKGROUND OF THE INVENTION

1. Field of the Invention

The present invention relates to an apparatus and method for head positioning control executed in a disk drive, and more particularly to an apparatus and method for head positioning control, capable of correcting variations in disk runout that occurs in synchronism with the rotation of a spindle motor, the variations being caused by variations in the radial position of the head on a disk.

2. Description of the Related Art

Conventional disk drives represented by hard disk drives (HDD) incorporate a head positioning control system (servo system) configured to position their head to a target position on a disk (disk recording medium). In this system, an actuator having a head mounted thereon is treated as a to-be-controlled object, i.e. a plant. The system controls the actuator on the basis of servo data that is reproduced by the head from servo areas dispersedly located on the disk. The system provides a seek control function of executing a seek operation for moving the head to a target track by driving the actuator, and a track following control function of executing a track following operation for positioning, in a target area, the head moved to the target track.

In the prior art, the head positioning control system (servo system) is generally realized by a feedback control system. The feedback control system mainly comprises a detector for detecting a position error, and a feedback controller. The detector detects a position error "e" between a head position "y" and a target position "r". The target position "r" indicates a target track in the seek operation, and also indicates, for example, a center line of a target track in the track following operation. Where the head is formed of a read head and a write head, similar to an MR (Magneto Resistive) head, the target position in the track following operation differs between a reading time and a writing time.

The feedback controller calculates a controlled variable Ub for eliminating the position error "e" detected by the detector. The controlled variable Ub is supplied to a plant. The plant drives the head on the basis of the controlled variable Ub from the feedback controller. The feedback controller is a microprocessor (CPU) as a main controller of the disk drive. Further, the to-be-controlled object (plant) is a rotary actuator that includes a voice coil motor (VCM).

It is confirmed that the target position "r" on the disk relative to the head position varies in synchronism with the rotation of the disk. It is also confirmed that the cause of this kind of "runout" lies, for example, in disk runout that occurs in synchronism with the rotation of the spindle motor, or in radial deformation of the disk that results from the screwing of the disk to the hub of the spindle motor. However, the aforementioned feedback control system cannot detect this kind of runout.

In light of the above, Jpn. Pat. Appn. KOKAI Publication No. 11-39814, for example, proposes a servo system in which the runout of the target position, which occurs in synchronism with the rotation of the disk, is calculated from the position error, and the runout component is eliminated therefrom. The runout component is obtained, in the form of the sine and cosine components of a Fourier coefficient corresponding to each degree of the runout, by subjecting the detected position error to Fourier series expansion. In the servo system (head positioning control system) described in the publication, in the track following operation, adaptive learning is utilized to obtain a runout component in the present head position. In this learning, the runout component in the present head position is obtained by adding a change in Fourier series, calculated from the detected position error at the present time point, to the Fourier coefficient of the runout component obtained one sampling before, i.e. the learned value. The learning method requires an initial value for the learned value.

However, when imparting an initial learned value to the servo system, the following must be considered. First, the head is driven by a rotary actuator. Accordingly, the locus of the head on the disk is arcuate. This means that the runout component synchronous with the rotation of the disk varies in accordance with the track position in which the head is situated, i.e. the radial position of the head on the disk. In light of this, it is necessary to switch the initial learned value from one to another.

U.S. Pat. No. 6,002,540 discloses a technique (hereinafter referred to as a "prior technique") for correcting a runout component value, obtained by learning in a predetermined track, in accordance with the position of a target track, thereby determining the initial learned value. In this prior technique, an amplitude difference in the correction amount due to the difference in radial position on the disk is calculated on the basis of a predetermined single formula model.

In actual disk drives, however, the relationship between the radial position (track position) of the head on the disk and the runout does not always correspond to that expressed by the formula model. Therefore, the prior technique cannot account for variations in properties between different apparatuses. In other words, since the prior technique uses an initial value that is not suitable for actual disk drives, a lot of time is required to correct a difference in the runout component after the seeking operation, which degrades the performance of the apparatus.

BRIEF SUMMARY OF THE INVENTION

The present invention has been developed in light of the above-described circumstances, and aims to realize head positioning control in which a runout component value suitable for an actual disk drive and corresponding to a target position is used as an initial adaptive learned value, thereby enabling a head to follow the target position accurately.

According to an aspect of the invention, there is provided a system for head positioning control that includes seek control, used to move a head to a target position on a disk, and track following control, used to situate the head in a target area related to the target position. This system comprises position error detecting means, feedback value calculating means, adaptive learning means, feedforward value calculating means, control amount generating means, a memory, and determining means. The position error detecting means detects a position error between the position of the head and the target position. The feedback value calculating means calculates, from the position error, a feedback value used to eliminate the position error. The adaptive learning means acquires, by adaptive learning, a runout component that is included in the position error and synchronous with the rotation of the disk. The feedforward value calculating means calculates a feedforward value used to suppress the runout component acquired by the adaptive learning means. The control amount generating means generates, from the feedback value and the feedforward value, a control amount used to situate the head in the target position. The memory stores values of the runout component, which are obtained in respective predetermined radial positions on the disk and are used as initial values in adaptive learning executed by the adaptive learning means. The determining means selects, from the memory, one of the initial values, used in adaptive learning by the adaptive learning means, in accordance with the target position, and supplies the selected initial value to the adaptive learning means.

In the above-described system, an initial adaptive learned value is changed, depending upon a target position, to a value that reflects a difference in runout component between radial positions on a disk in an actual disk drive due to, for example, deformation of the disk. Therefore, a head incorporated in the disk drive can be made to follow the target position accurately, without being influenced by variations in runout characteristic between different disk drives.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
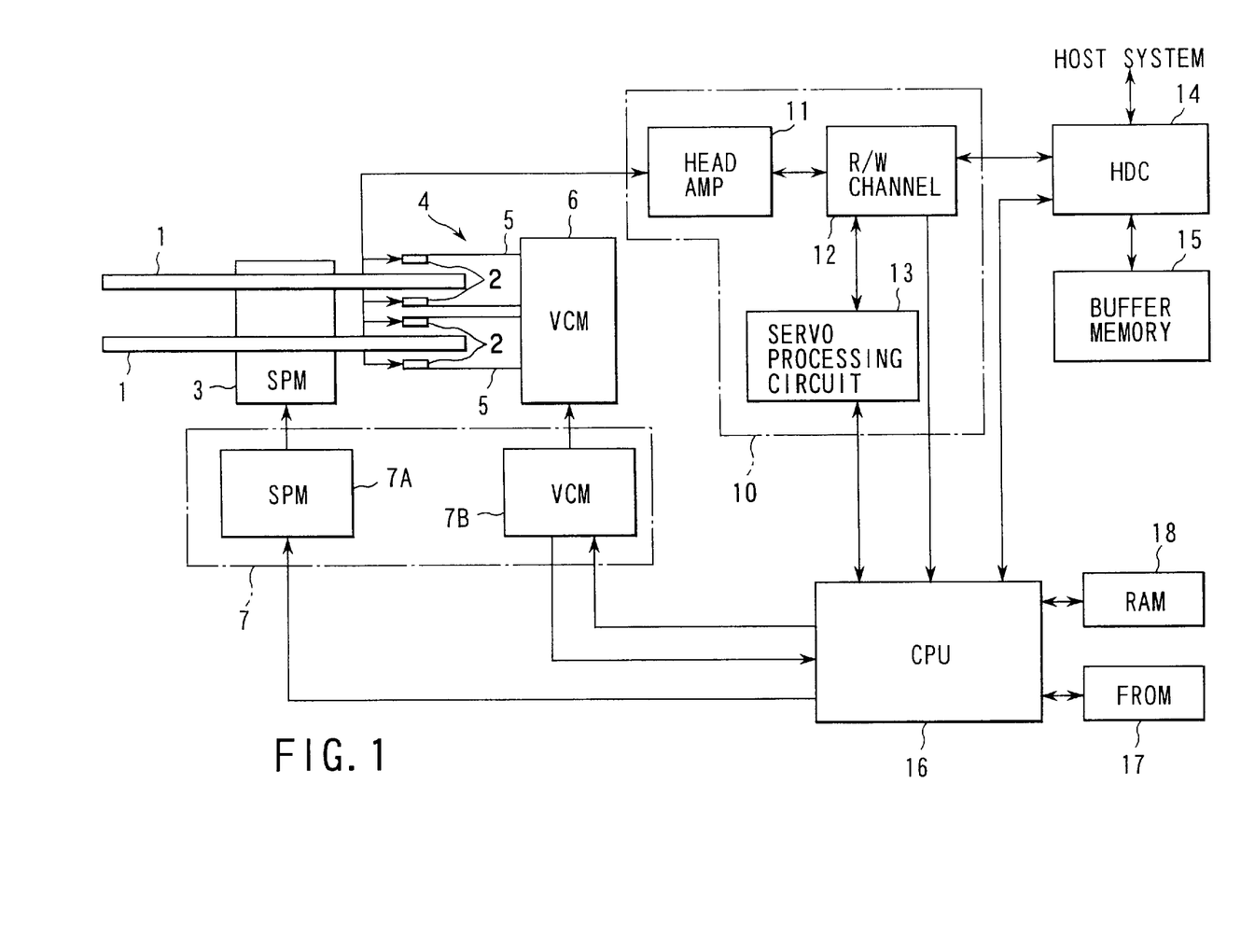
FIG. 1 is a block diagram illustrating the structure of a hard disk drive according to an embodiment of the present invention.

An embodiment in which the present invention is applied to a hard disk drive will be described with reference to the accompanying drawings. FIG. 1 is a block diagram illustrating the structure of a hard disk drive according to the embodiment of the present invention. The hard disk drive (HDD) shown in FIG. 1 includes, for example, two disks (magnetic disks) 1 on which data is to be magnetically recorded. Each disk 1 is of upper and lower disk surfaces. At least one disk surface (both the disk surfaces in this embodiment) of each disk 1 is a recording surface on which data is to be recorded. A head (magnetic head) 2 is provided for each recording surface of each disk 1. The head 2 is used to write or read data into or from the disk 1. FIG. 1 shows an HDD provided with two disks 1 stacked on one another. The invention is not limited to this, but may be an HDD provided with two or more disks 1 stacked or with a single disk 1.

A large number of concentric data tracks (not shown) are provided on each recording surface of each disk 1. Each track includes servo areas (not shown) that have servo data recorded therein and are arranged at regular intervals. In other words, in the HDD of the embodiment, a so-called sector servo type format is employed in each disk 1. The servo data includes a track code (cylinder number) and servo burst data. The track code is a track address used to recognize a data track. The servo burst data is position error data used during the track following operation for positioning the head 2 in a target area of the data track. A plurality of data sectors (not shown) are arranged between servo areas. Each servo area extends on each disk 1 from its center to its radially outermost portion, radially traversing the tracks.

Each disk 1 is rotated at a high speed by a spindle motor (hereinafter referred to as an "SPM") 3. Each head 2 is attached to a rotary actuator 4. The actuator 4 mainly comprises an arm 5 with a suspension that supports the head 2, and a voice coil motor (VCM) 6 that radially drives the arm 5 on a corresponding disk 1. The actuator 4 corresponds to a plant (Ps) 23 as a to-be-controlled object in a servo system described later.

The SPM 3 is powered by a driving current (an SPM current) supplied from an SPM driver 7A. The actuator 4 is powered by a driving current (a VCM current) supplied from a VCM driver 7B. In this embodiment, the SPM driver 7A and the VCM driver 7B are formed of a driver IC 7, an integrated circuit as one chip.

Each head 2 is connected to a signal processing section 10. The signal processing section 10 comprises a head amplifier (head IC) 11, a read/write (R/W) channel 12 and a servo processing circuit 13. The head amplifier 11 includes a read amplifier that amplifies a read signal read by the head 2, and a write amplifier that converts write data into a write current. The R/W channel 12 executes various types of processes such as an A/D (Analog/Digital) conversion process on the read signal, an encoding process on write data, and a decoding process on read data, etc. The R/W channel 12 has a pulsing function of pulsing the read signal and outputting the pulsed read data, and a function of extracting servo burst data from servo data in accordance with a timing signal (a burst timing signal) output from the servo processing circuit 13. The servo burst data is supplied to the CPU 15, which uses the data in track following control for positioning the head 2 in a target area of a target track.

The servo processing circuit 13 provides a function of creating various types of timing signals, which include the burst timing signal, from a read pulse signal output from the R/W channel 12, and a function of extracting a track code contained in servo data. The track code is supplied to the CPU 16, which uses the code in seek control for moving the head 2 to a target track.

The disk controller (HDC) 14 is connected to a host system that uses the HDD. The host system is a digital device such as a personal computer. The disk controller 14 provides an interface control function of receiving a command (a write command, a read command, etc.) transferred from the host system, and controlling data transfer between the host system and the disk controller 14 itself. The disk controller 14 also provides a disk control function of controlling data transfer between the disk 1 and the disk controller 14 itself via the signal processing section 10, and a buffer control function of controlling the buffer memory 15. The buffer memory 15 is mainly used as a write cache for temporarily storing data (write data) to be transferred from the host system and written into the disk 1, and a read cache for temporarily storing data (read data) to be read from the disk and transferred to the host system. The buffer memory 15 is, for example, a RAM (Random Access Memory).

The CPU 16 controls the entire HDD in accordance with a control program stored in an FROM (Flash Read Only Memory) 17. The FROM 17 is a rewritable nonvolatile memory. The control program includes a control process for the servo system. The control realized by the CPU 16 executing the control process includes the seek control for moving the head 2 to a target track on the basis of a track code extracted by the servo processing circuit 13, and the track following control for positioning the head 2 in a target area of the target track on the basis of burst data extracted by the R/W channel 12. The CPU 16 is connected to the FROM 17 and the RAM 18. The RAM 18 is a rewritable memory, and provides, for example, a work area for the CPU 16.

Figure 2:
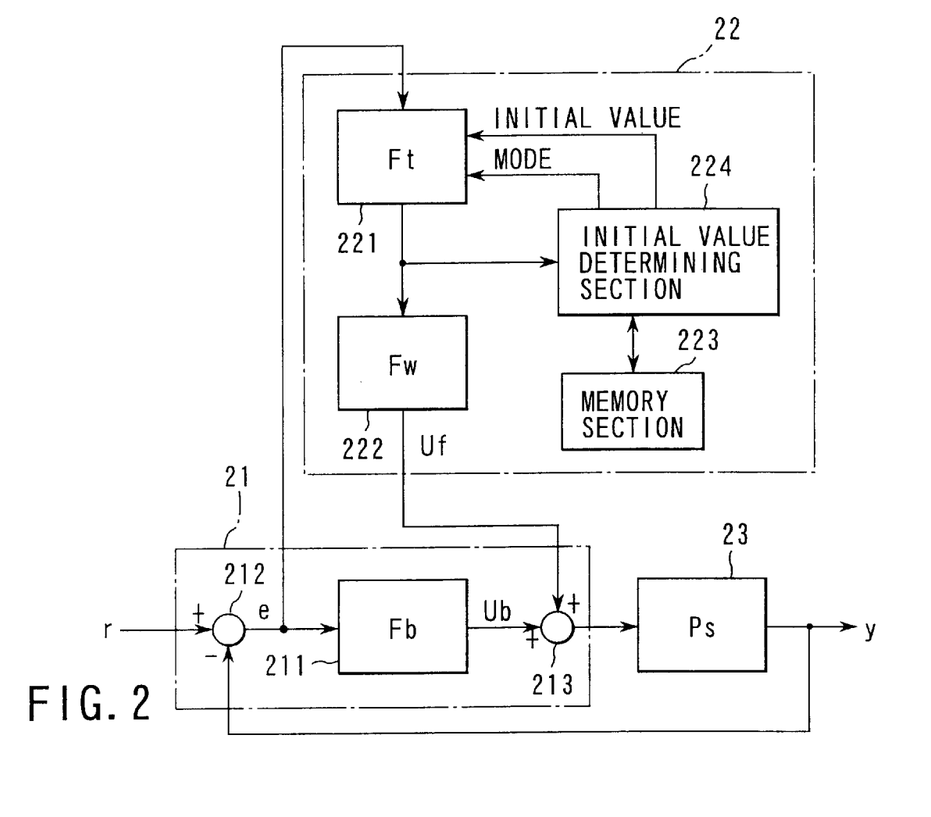
FIG. 2 is a block diagram useful in explaining the concept of a servo system realized in the embodiment.

FIG. 2 is a block diagram useful in explaining the concept of the servo system that is realized by the control process executed by the CPU 16 shown in FIG. 1. The servo system shown in FIG. 2 is a head positioning control system for positioning the head 2 in a target area of the disk 1, which is determined by a target position. The servo system includes a feedback control system 21 and a learning-type feedforward control system 22. The feedback control system 21 mainly includes a feedback controller (Fb) 211 and a position error detector 212. The feedforward control system 22 mainly includes a runout detector (Ft) 221 and a feedforward controller (Fw) 222.

In the feedback control system 21, the position error detector 212 detects a position error "e" between the target position "r" and a head position "y". In the case of the seek control, the target position "r", the head position "y" and the position error "e" indicate a target track (target seek position), a track on which the head 2 is situated, and the difference between the target track and the track on which the head 2 is situated, respectively. The track on which the head 2 is situated is indicated by a track code extracted from servo data by the servo processing circuit 13. On the other hand, in the case of the track following control, the position error "e" is indicated by the A/D conversion value of the amplitude of servo burst data extracted from a read signal by the R/W channel 12. The feedback controller 211 calculates, from the position error "e", a control amount (feedback value) Ub that can eliminate the position error "e". The mode in which the seek control is executed will be hereinafter referred to as a "seek mode", while the mode in which the track following control is executed will be referred to as a "track following mode".

In the feedforward control system 22, the runout detector 221 detects (calculates), in the track following mode, a runout component contained in the position error "e" and synchronous with the rotation of the disk 1, using the Fourier transform. However, in the HDD of the embodiment, since a sector servo type format is applied to the disk 1, servo data is obtained only in a discrete manner. Accordingly, the position error "e" is detected at each servo data sampling time. The runout detector 221 detects (calculates) the runout component of the position error "e" each time the position error detector 212 detects the position error "e", on the basis of the position error "e" and the detection result (learned value) of the runout detector 221 obtained one sampling before. In other words, the runout detector 221 is an adaptive learning unit that obtains the runout component of the position error "e" by adaptive learning.

The runout detector 221 is used to determine a feedforward amount from a position error that cannot be completely eliminated by the control of the feedback controller 211. The runout component detected by the runout detector 221 varies depending upon the characteristics of the entire system, which are based on variations in the gain of the plant 23 or variations in the detection system. The gain of the plant 23 varies depending upon variations in, for example, the torque constant of the VCM 6. The torque constant of the VCM 6 varies depending upon whether the head 2 is positioned at the inner radius side of the disk 1 or the outer radius side thereof. Further, variations in the detection system include variations in the relationship between the position error of the head 2 and a burst amplitude, and the difference in yaw angle between the inner radius and the outer radius of the disk 1, etc. Thus, the runout detector 221 does not directly detect the physical runout component of the disk 1, but calculates a feedforward amount used to sufficiently suppress a runout component that cannot be completely suppressed by a control amount determined by the feedback controller 211. The actual feedforward amount differs between different radial positions on the disk 1, on which the head 2 is situated, because of the aforementioned variations.

The runout component detected (calculated) by the adaptive learning by the runout detector 221 is supplied to the feedforward controller 222. In the seek mode, the runout detector 221 stops its adaptive learning and outputs the initial value of the runout component (adaptive-learned value) to the feedforward controller 222.

Figure 4:
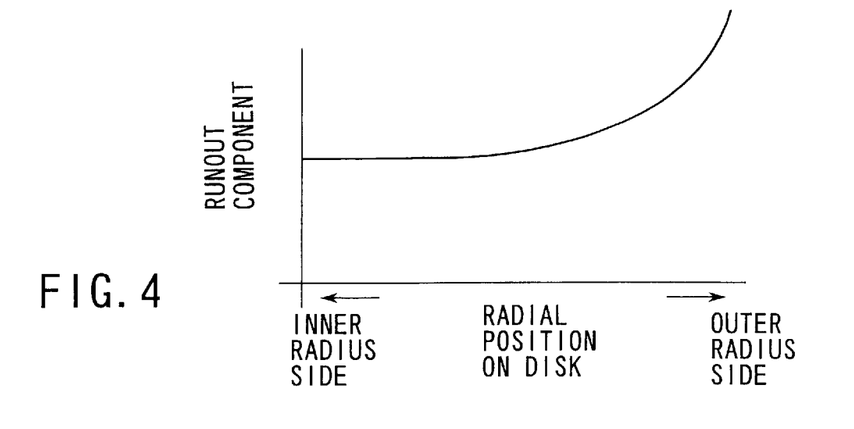
FIG. 4 is a graph indicating the runout component characteristic of a disk 1, which changes depending upon the radial position on the disk 1.

The runout component synchronous with the rotation of the disk 1 differs between different radial positions on the disk 1 (hereinafter referred to simply as "radial positions"). As shown in FIG. 4, the runout component significantly differs between the inner radius side and outer radius side of the disk 1. In the above-described prior art, the runout component obtained by learning on a predetermined track is corrected on the basis of the position of a target track, thereby determining an initial learned value suitable for the head position. In the actual HDD, however, the relationship between the radial position of the head on the disk (track position) and the runout component varies between different HDDs and between different recording surfaces (heads). In other words, the relationship therebetween is not necessarily identical to a model relationship obtained using a formula.

Figure 3A:
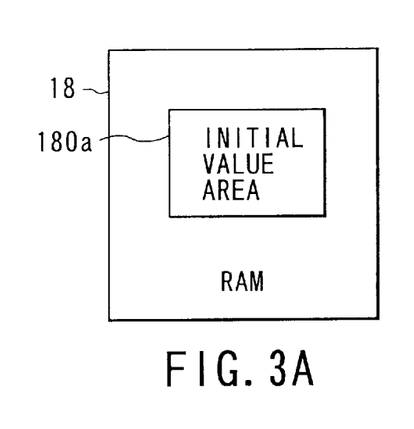
FIG. 3A is a view illustrating a state in which a RAM 18 includes an initial value area.
Figure 5:
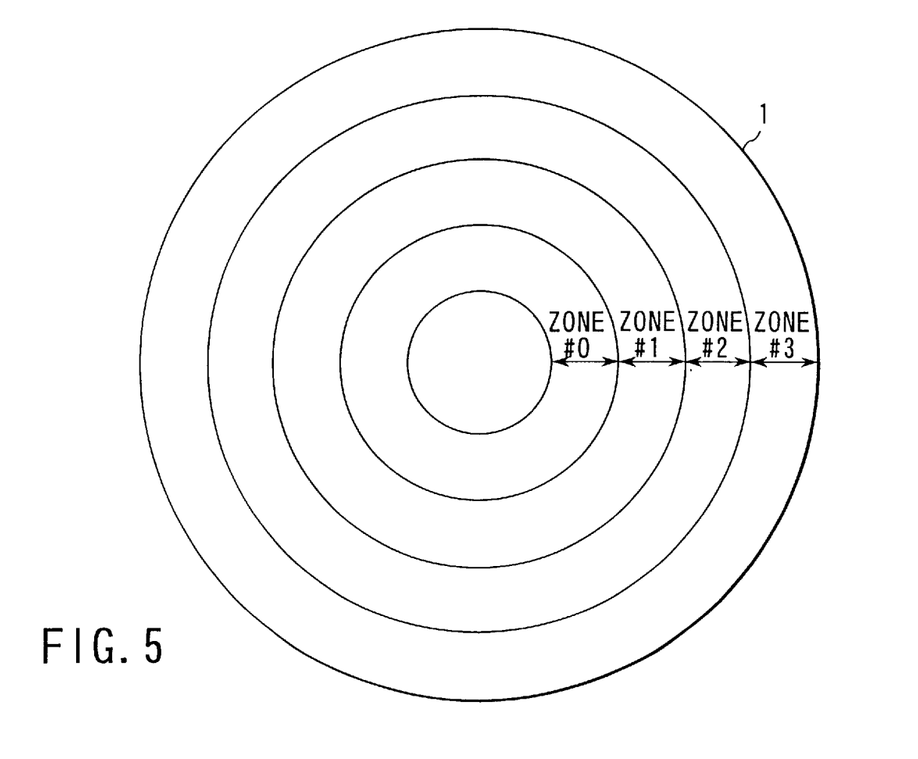
FIG. 5 is a view useful in explaining zones on the disk 1.

In light of this, in the embodiment, each of the recording surfaces of the two disks 1, which correspond to the heads #0–#3, respectively, is divided into a number n of concentric zones "0"–"n−1", and each zone "i" (i=0–n−1) is managed in the following manner. When activating the HDD, the runout component of a predetermined track (e.g. a substantially central track) in each zone "i" (i=0–n−1) of each head (recording surface) of each disk 1 is detected by learning. The learned runout component value of the predetermined track in each zone "i" is stored in the RAM 18 as the initial value of a runout component value inherent in each zone "i". Accordingly, the RAM 18 includes an initial value area 180a, as shown in FIG. 3A, for storing an initial learned runout component value for each zone "i" of each head (recording surface). In the embodiment, it is supposed that the number of zones is four; zones #0–#3, as shown in FIG. 5.

Figure 3B:
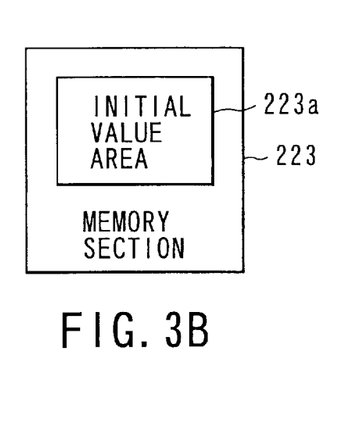
FIG. 3B is a view illustrating a state in which a memory section 223 includes an initial value area.

The feedforward control system 22 is provided with a memory section 223 and an initial value determining section 224, in addition to the runout detector 221 and the feedforward controller 222. Part of the RAM 18 is utilized as the memory section 223. As seen from FIG. 3B, the memory section 223 includes an initial value area 223a that corresponds to the initial value area 180a in the RAM 18. The initial value determining section 224 determines an initial value necessary for runout detection (adaptive learning) by the runout detector 221.

The feedforward controller 222 calculates, on the basis of a runout component value output from the runout detector 221, a control amount (feedforward value) Uf used to eliminate the runout component from the position error "e". The feedback control system 21 provides the plant 23 with a control amount obtained by adding, using an adder 213, the control amount Uf calculated by the feedforward controller 222 to the control amount Ub calculated by the feedback controller 211.

Figure 6:
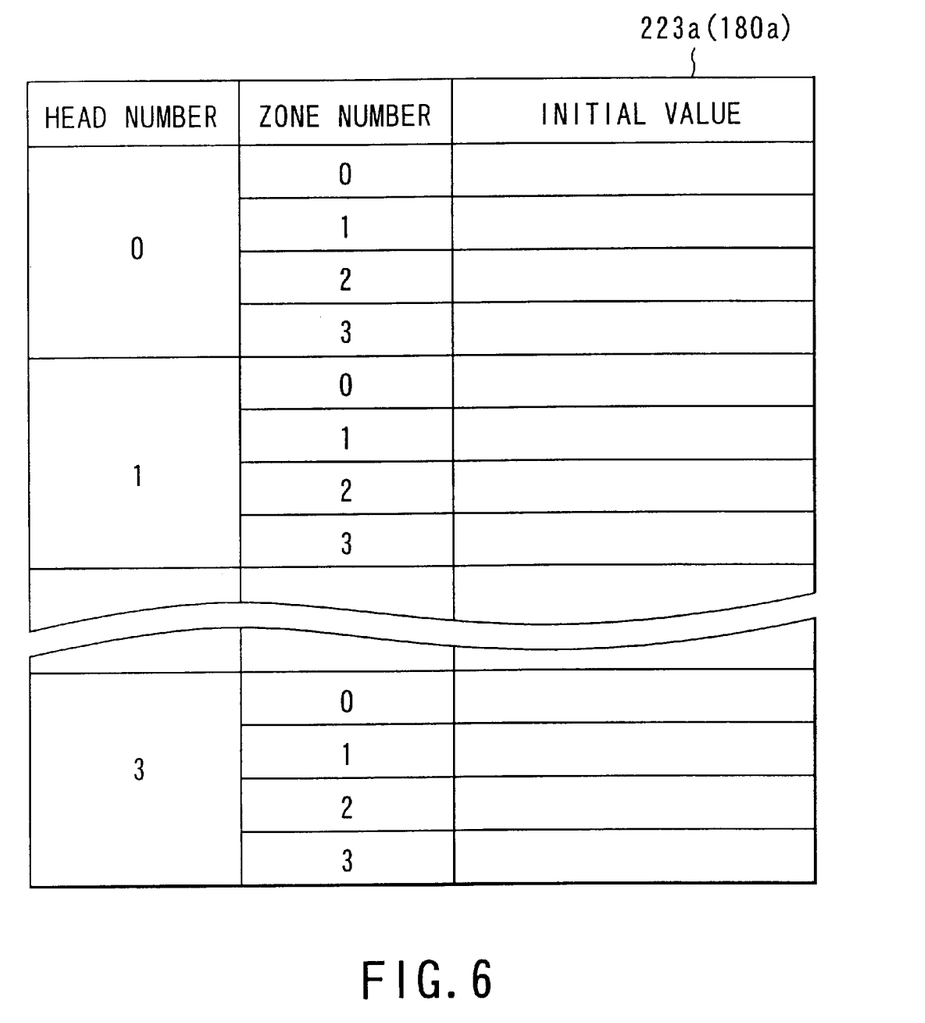
FIG. 6 is a view illustrating an example data structure in the initial value area.
Figure 7:
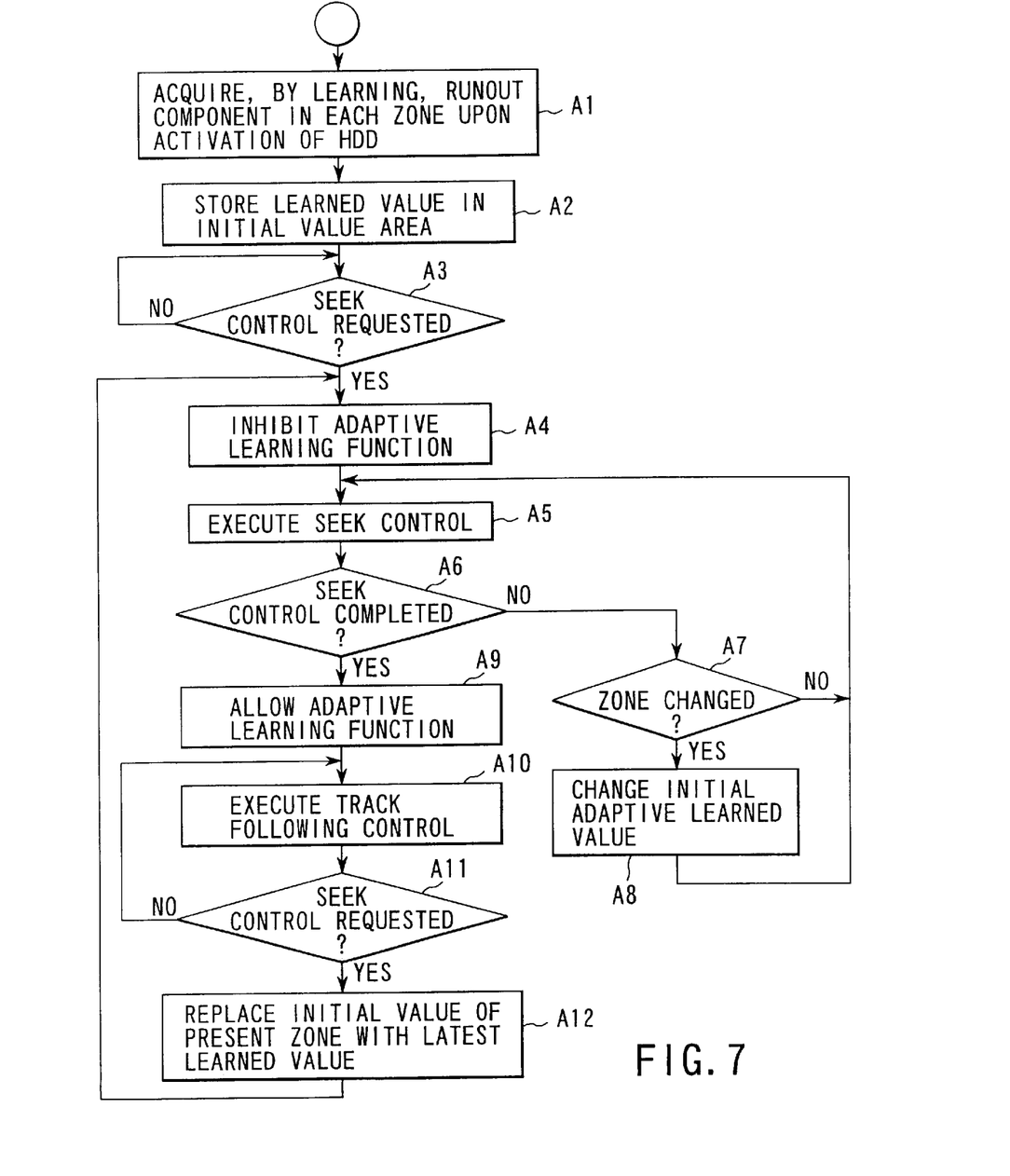
FIG. 7 is a flowchart useful in explaining operations executed in the embodiment.

Referring now to the flowchart of FIG. 7, the operation of the embodiment will be described. First, the initial value determining section 224 obtains, by learning, the runout component of each zone #0–#3 of each head (recording surface) #0–#3 of each disk 1 when the HDD is activated (step A1). This learning is executed by moving the head 2 to a substantially central track in each zone #i (i=0–3) in the seek operation. The learning itself is similar to that in the track following operation, which is executed after the head is moved to a track designated by a read/write command that is output from the host system after the activation of the HDD. Therefore, no description is given here of the learning. The learned runout component value obtained in each zone #0–#3 of each head #0–#3 is stored, as an initial value in the form of a table as shown in FIG. 6, in the initial value area 223a of the memory section 223, i.e. the initial value area 223a in the RAM 18 (step A2).

Suppose that a read/write command is supplied from the host system to the HDD after the HDD is activated, and the CPU 16 has requested a seeking operation for shifting the head 2 to a target track of the disk 1 designated by the command (step A3). In this case, the CPU 16 executes seek control (speed control) for shifting the head 2 to the target track, in accordance with the control process included in the control program.

The operation executed for the seek control will be described in detail, taking, for example, the operation realized in the servo system by the CPU 16 executing the control process. First, each time the head 2 reads servo data, the position error detector 212 receives a track code that is extracted as the head position "y" from the servo data by the servo processing circuit 13. The position error detector 212 also receives the target position "r" as information indicative of a target track.

The initial value determining section 224 designates the seek mode as a mode for the runout detector 221, thereby stopping its runout component adaptive learning function (step A4). In this state, the seek control is executed in the following manner (step A5). The initial value determining section 224 reads, from the initial value area 223a in the memory section 223, an initial runout component value (initial adaptive learned value) corresponding to a zone to which a track (the head position "y") with the head 2 positioned thereon belongs. The read value is supplied to the runout detector 221. When the adaptive learning function is in the OFF state, the runout detector 221 outputs, as a detection result, the runout component initial value supplied from the initial value determining section 224.

The feedforward controller 222 calculates a digital control amount (feedforward value) Uf on the basis of a runout component value output from the runout detector 221. The control amount Uf is used to eliminate the runout component from the position error "e", i.e. to suppress (compress) the runout component contained in the position error "e".

The feedback control system 21 provides the plant 23 with a control amount obtained by adding, using an adder 213, the control amount Uf calculated by the feedforward controller 222 to the control amount Ub calculated by the feedback controller 211. Actually, however, the addition result (digital value) of the control amounts Uf and Ub is output to the VCM driver 7B. The addition result of Uf and Ub is converted into a voltage signal by a D/A converter incorporated in the VCM driver 7B. A negative or positive VCM current determined from the voltage signal is supplied from the VMC driver 7B to the VCM 6. The VCM 6 is an element included in the actuator 4 as the plant 23. The head 2 can be moved to a target track by repeating the above-described seek control at each servo data sampling time.

When the zone to which the head position "y" belongs is switched from one to another during the seek control (steps A6 and A7), the initial value determining section 224 switches the initial adaptive learned value to be read from the initial value area 223a of the memory section 223, to an initial value corresponding to a new zone (step 8A). Accordingly, the runout component output from the runout detector 221 to the feedforward controller 222 is changed to an initial value corresponding to the new zone.

After the head 2 is moved to the target track, i.e. the seek operation is finished (step 6A), the initial value determining section 224 designates the track following mode as a mode for the runout detector 221, thereby activating the runout component adaptive learning function (step A9). In this state, the track following control is executed as below, to settle the head 2 in a target area based on a target position (e.g. the center line of the target track) on the target track (step A10).

First, each time the head 2 reads servo data, the position error detector 212 detects the position error "e" indicated by the A/D conversion value of the amplitude of servo burst data extracted from a read signal by the R/W channel 12. The runout detector 221 executes adaptive learning each time the position error detector 212 detects the position error "e". In the adaptive learning, a runout component value included in the position error "e" is detected (calculated) on the basis of the position error "e" and the detection result (adaptive learned value) of the runout detector 221 obtained one sampling before. At the start of the track following control, an initial value supplied from the initial value determining section 224 is used as an adaptive learned value one sampling before. This is equivalent to a case where the initial value determining section 224 supplies the runout detector 221 with an initial value corresponding to the zone to which the target track (the target position "r") belongs.

The runout detector 221 executes the adaptive learning in the following manner. First, the runout component of the error "e", which is synchronous with the rotation of the disk, can be considered to be a periodic function. The runout component can be expressed using a Fourier series expansion. Accordingly, supposing that T represents the rotation cycle of the disk, and e(t) represents information on the detected position error, e(t) can be expressed by the following formula 1:

$$e(t) = a_1 \sin\frac{2\pi}{T}t + a_2\sin2\frac{2\pi}{T}t + a_3\sin3\frac{2\pi}{T}t + \cdots + \\ b_1\cos\frac{2\pi}{T}t + b_2\cos2\frac{2\pi}{T}t + b_3\cos3\frac{2\pi}{T}t + \cdots + \frac{1}{2}c_0 \quad (1)$$

where $a_1$, $a_2$, $a_3$, . . . , $b_1$, $b_2$, $b_3$, . . . , $c_0$ represent Fourier coefficients and indicate the values and phases of corresponding runout component. The attached numerals 1, 2, 3, . . . , of the Fourier coefficients represent respective degrees.

The sine (sin) component am and cosine (cos) component $b_m$ (m=1, 2, 3, . . . ) of each Fourier coefficient can be calculated by the following formula 2:

$$a_m = \frac{2}{T}\int_{-\frac{T}{2}}^{\frac{T}{2}} e(t)\sin m\frac{2\pi}{T}t\,dt \\ b_m = \frac{2}{T}\int_{-\frac{T}{2}}^{\frac{T}{2}} e(t)\cos m\frac{2\pi}{T}t\,dt \\ c_0 = \frac{2}{T}\int_{-\frac{T}{2}}^{\frac{T}{2}} e(t)\,dt \quad (2)$$

$m$ : degree

In the HDD of the embodiment, since servo data is obtained only dispersedly, the position error "e" cannot be obtained continuously in time. The Fourier coefficients am and bm are calculated by the following formula 3:

$$a_m = \frac{2Ts}{T}\sum_{i=1}^{\frac{T}{Ts}} e(i)\sin m\frac{2\pi}{T}t(i) \\ b_m = \frac{2Ts}{T}\sum_{i=1}^{\frac{T}{Ts}} e(i)\cos m\frac{2\pi}{T}t(i) \quad (3)$$

$Ts$ : sampling time

From the formula 3, the following formula 4 can be obtained:

$$a_m(k) = a_m(k-1) + \frac{2Ts}{T}e(k)\sin m\frac{2\pi}{T}t(k) \\ b_m(k) = b_m(k-1) + \frac{2Ts}{T}e(k)\cos m\frac{2\pi}{T}t(k) \quad (4)$$

where changes in the Fourier coefficients based on the detection information e(k) obtained at the present time point (k) are sequentially added to the Fourier coefficients $a_m(k-1)$ and $b_m(k-1)$ of a runout component value obtained one sampling before (at a time point (k-1)).

Further, $a_m(k-1)$ and $b_m(k-1)$ represent updated learned values stored in the runout detector 221. The initial values of $a_m(k-1)$ and $b_m(k-1)$, i.e. $a_m(k-1)$ and $b_m(k-1)$ obtained at a time point of 0(=k-1), are supplied from the initial value determining section 224 as aforementioned.

The runout detector 221 calculates the sine component $a_m(k)$ and the cosine component $b_m(k)$ of a runout component value of a particular frequency (degree=m) at the present time point (k), using the formula 4 on the basis of the updated learned values formula 4 on the basis of the updated learned values ($a_m(k-1)$, $b_m(k-1)$) and the position error e(k). The runout detector 221 holds the calculated runout component as an updated adaptive learned value, which is used when a runout component value is calculated (learned) at the next sampling time, using the formula 4. In other words, the runout detector 221 updates the learned value held therein.

The runout component calculated by the runout detector 221 is output to the feedforward controller 222. On the basis of the runout component, the feedforward controller 222 calculates the control amount Uf used to eliminate the runout component from the position error "e". The control amount Uf and the control amount Ub calculated by the feedback controller 211 are input to the adder 213, where they are added to each other. The addition result (Uf+Ub) of the adder 213 is supplied to the plant 23 as a control amount for it.

After the head 2 reads servo data and the above-described track following control is executed, it is determined whether or not there is a new request for seek control (step A11). If there is no request for seek control, the next servo data is read and servo burst data is extracted, thereby executing the next track following control (step A10). On the other hand, if there is a new request for seek control, the initial value determining section 224 updates the initial learned value corresponding to the zone in which the head is positioned at the present stage, and stored in the initial value area 223a of the memory section 223, by replacing the initial learned value with the latest learned value obtained by the runout detector 221 at the present sampling time (step A12). After that, the process starting from the step A4 is executed.

As a result of the execution of the step A12, if the seek operation is executed in the same zone next time, the updated adaptive learned value obtained by the above track following control is used as an initial adaptive learned value, instead of the initial value obtained when the HDD is activated. This further enhances the track following accuracy.

As described above, in the embodiment, the initial adaptive learned value is changed to a value that reflects the difference in runout component between different radial portions of the disk (different radial positions) in the actual HDD, in accordance with the zone to which the target position "r" (target track) belongs. Accordingly, the head 2 can follow the target position accurately. Further, in the embodiment, initial adaptive learned values corresponding to respective zones are prepared for each head (recording surface), and the initial value corresponding to the head (recording surface) and zone, to which the target position "r" belongs, is used in the actual adaptive learning. This being so, even if the relationship of the runout component to the radial position on the disk (i.e. the runout characteristic) differs between different heads (recording surfaces) in the HDD, the head 2 can follow a target position more accurately without being influenced by the differences.

Moreover, in the embodiment, if there is a new request for seek control to shift the head 2 to a new target position (new target track) while track following control is being executed, the initial learned value for the present zone in which the head is positioned at present is replaced with the latest adaptive learned value obtained by the runout detector 221. This updated initial value indicates a runout component value for the present zone in the HDD of the updated state. Accordingly, the use of the updated initial value for adaptive learning enables the head 2 to follow the new target position more accurately. In addition, in the embodiment, a runout component value is calculated by learning in each zone of each head (recording surface) at the time of activating the HDD, and the resultant learned values are set as initial adaptive learned values for the zones.

This enables the head 2 to follow a target position accurately in any HDD, without being influenced by inherent variations and/or variations with time in a runout component value in each zone of each head (recording surface) between HDDs.

In the above-described embodiment, only when a request for seek control has occurred during the execution of track following control, the initial learned value, stored in the memory section 223 for the zone in which the head is positioned at present, is replaced with the latest adaptive learned value obtained by the runout detector 221. However, this structure may be modified such that each time the runout detector 221 obtains an adaptive learned value, the aforementioned initial value is replaced with this adaptive learned value, irrespective of whether or not a request for seek control occurs. Furthermore, in the embodiment, the initial value supplied from the initial value determining section 224 to the runout detector 221 in the seek mode is also output to the feedforward controller 222. However, this structure can be modified such that either the initial value output from the initial value determining section 224 or the runout component detected (calculated) by the runout detector 221 is supplied to the feedforward controller 222. To realize this modification, it is sufficient if a selector is provided between the runout detector 221 and the feedforward controller 222, thereby supplying the feedforward controller 222 with either the initial value output from the initial value determining section 224 or the runout component detected (calculated) by the runout detector 221. In this case, the initial value determining section 224 controls the selector so as to select the initial value in the seek mode, and select the runout component from the runout detector 221 in the track following mode.

In the seek mode, the feedforward control system 22 may be separated from the servo system, thereby driving only the feedback control system 21. In this case, when the mode has been shifted from the seek mode to the track following mode, the feedforward control system 22 is driven together with the feedback control system. Further, in this case, upon switchover to the track following mode, it is sufficient if an initial value corresponding to a zone, to which a target track belongs, is supplied from the initial value determining section 224 to the runout detector 221.

[First Modification]

A description will now be given of a first modification of the above-described embodiment, with reference to FIGS. 1 and 2 for facilitating the description. In the above-described embodiment, since a runout component value is calculated by learning in each zone when activating the HDD, a long time is required to activate the HDD. The first modification aims to avoid a long HDD activation period. The first modification is characterized in that i) the learning of a runout component value for each zone is executed while each HDD is being manufactured, and the learning results are stored in the FROM 17, and also in that ii) the learned value (initial value) of the runout component for each zone of each head (recording surface) is corrected when activating each HDD, since it is possible that the runout component may vary over time.

Figure 8:
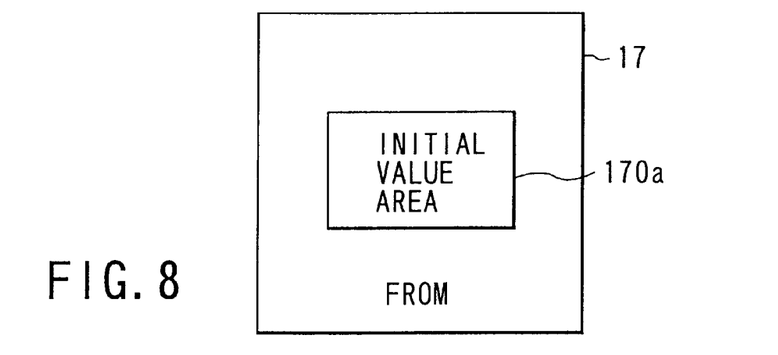
FIG. 8 is a view illustrating a state in which a FROM 17 employed in a first modification of the embodiment includes an initial value area.

In the first modification, the FROM 17 includes an initial value area 170*a* as shown in FIG. 8. The data structure of the initial value area 170*a* is similar to that (see FIG. 6) of the initial value area 180*a* (223*a*) in the RAM 18 (memory section 223). The initial value area 170*a* of the FROM 17 stores the learned values (initial values) of runout component values with respective predetermined frequencies, which were obtained in each zone #0–#3 of each head (recording surface) #0–#3 in the manufacturing stage of each HDD.

Figure 9:
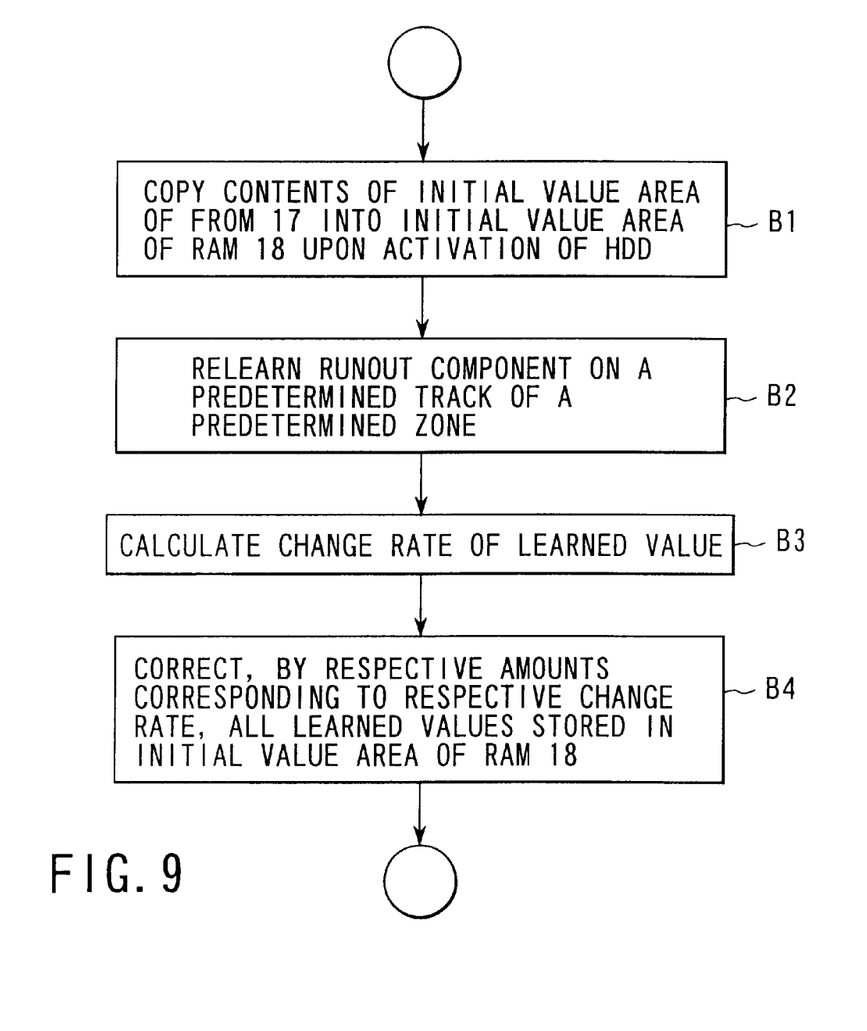
FIG. 9 is a flowchart useful in explaining a process of correcting a learned value in the first modification.

Referring to the flowchart of FIG. 9, the correction of the learned value (initial value) in the first modification will be described. Upon activation of the HDD shown in FIG. 1, the CPU 16 copies, in the initial value area 180*a* (223*a*) in the RAM 18 (memory section 223), the learned values (initial values) obtained during the manufacture of the HDD and stored in the initial value 170*a* of the FROM 17 (step B1).

After that, the initial value determining section 224 is activated. The initial value determining section 224 again executes the learning of the runout component in predetermined track TRs of predetermined zone #s (s is one of 0–3, e.g. 2) of each of the heads (recording surfaces) #0–#3 of two disks 1 (step B2). The predetermined track TRs is, for example, the same as a track of the zone #s, which was used for learning during the manufacture of the HDD i.e. a substantially central track of the zone #s. Subsequently, the initial value determining section 224 calculates, for each head, the change rate of the learned value obtained in the zone #s by relearning (step B3). This change rate indicates the change rate of the learned value obtained in the zone #s by relearning, to the learned value obtained in the same zone #s of the same head (recording surface) and stored in the initial value area 180*a* (223*a*) of the RAM 18 (memory section 223).

Thereafter, the initial value determining section 224 corrects, by respective amounts corresponding to respective change rates corresponding to the respective heads, learned values that are obtained in all zones of all the heads (recording surfaces), and are copied into the initial value area 180*a* (223*a*) (step B4). Specifically, supposing that the learned value obtained in zone #n during the manufacturing stage is represented by x(n), the learned value obtained in the predetermined zone #s during the manufacturing stage by x(ns), and the learned value obtained in the predetermined zone #s upon activation of the HDD, a corrected learned value x'(n) in the zone #n is expressed by the following equation:

$$x'(n) = x(n) * xs/x(ns) \quad (5)$$

where xs/x(ns) represents the change rate of the learned value.

Figure 10:
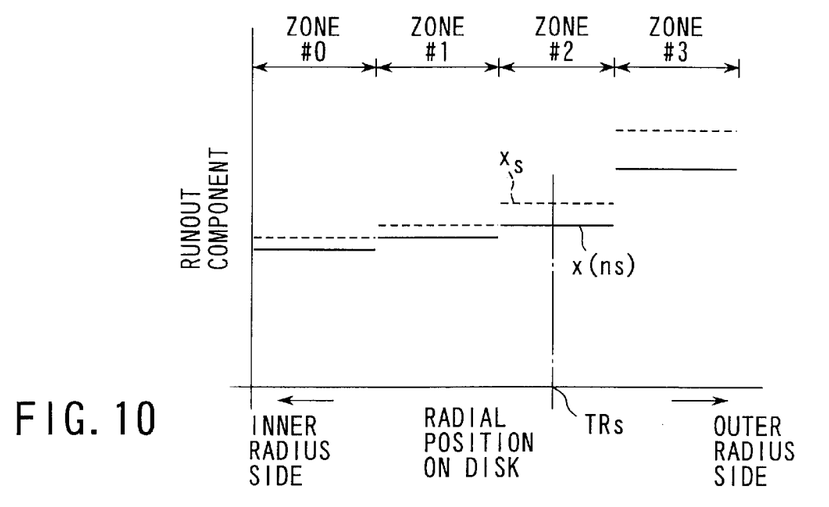
FIG. 10 is a view illustrating the relationship between the learned values before and after correction in the first modification.

The relationship between each learned value and its corrected value, obtained in one head (recording surface), is shown in FIG. 10. In the shown case, the solid lines indicate learned values obtained before correction (at the manufacturing stage), and the broken lines indicate learned values obtained after correction (upon activation of the HDD).

As aforementioned, in the first modification, the runout component is calculated by relearning in the predetermined track TRs of the predetermined zone #s in each head (recording surface). On the basis of the relationship (the change rate) between the relearned runout component and the learned value (initial value) in the same zone #s of the same head (recording surface) as above, which is copied into the initial value area 180a (223a), a learned value obtained at the present stage in each zone of the same head (recording surface) as above is estimated. The learned value in each zone of the same head (recording surface) as above, copied into the initial value area 180a (223a), is replaced with the estimated learned value. In the first modification, since the runout component is calculated by learning not in all zones of each head (recording surface) but in the predetermined zone #s, the time required for activating the HDD is prevented from being lengthened because of the learning process executed upon activation of the HDD.

[Second Modification]

A description will be given of a second modification of the above-described embodiment, with reference to FIGS. 1 and 2 for facilitating the description. In the above-described first modification, learned values obtained in respective zones of each head (recording surface) during the manufacturing stage are corrected upon activation of the HDD, and the thus-corrected learned value of each zone is commonly used irrespective of which track in each zone is used as a target track. However, even in the same zone, the influence of the runout component differs between different track positions. Accordingly, the corrected learned value does not always indicate an accurate runout component for each track in the same zone. Therefore, in the first modification, in order to more accurately correct a change in runout component, it is necessary to increase the number of zones and reduce the number of tracks that belong to each zone. In this case, a longer time is required for the learning process executed in the HDD manufacturing stage and the correction process executed in the HDD activation stage. The second modification aims to more accurately correct a change in runout component due to a change in track position, without increasing the number of zones. The second modification is characterized in that runout component values are obtained by learning in a plurality of tracks of each head (recording surface) in the HDD manufacturing stage, and a characteristic indicative of the relationship between the runout component and the track position (radial position) on each disk 1 is obtained from the learned values, thereby storing, in the FROM 17, information indicative of the characteristic (hereinafter referred to as "runout characteristic information"). The second modification is also characterized in that the runout characteristic information for each head is corrected upon activation of the HDD.

Figure 11A:
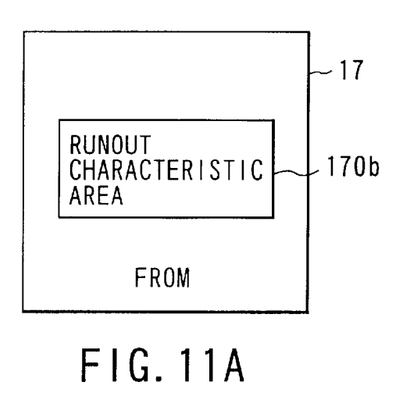
FIG. 11A is a view illustrating a state in which a FROM 17 employed in a second modification of the embodiment includes a runout characteristic area.
Figure 11B:
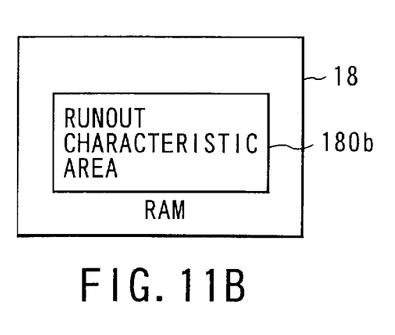
FIG. 11B is a view illustrating a state in which a RAM 18 employed in the second modification of the embodiment includes the runout characteristic area.
Figure 11C:
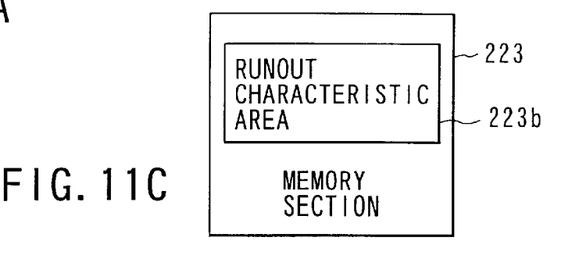
FIG. 11C is a view illustrating a state in which a memory section 223 employed in the second modification of the embodiment includes the runout characteristic area.

In the second modification, the FROM 17 includes a runout characteristic area 170b as shown in FIG. 11A. The runout characteristic area 170b stores runout characteristic information for each head. In this case, the RAM 18 and the memory section 223 include runout characteristic areas 180b and 223b as shown in FIGS. 11B and 11C, respectively. The contents of the runout area 170b of the FROM 17 are copied into the runout characteristic areas 180b and 223b. The runout characteristic information for each head is obtained by the CPU 16 in the following manner. First, runout component values in a plurality of tracks of each head (recording surface) are calculated by learning in the HDD manufacturing stage. On the basis of the resultant learned values, the characteristic of the runout component values with respect to track positions (radial positions on a disk) is approximated using a line graph or a curve graph for each head. Function information indicative of the approximation line or curve graph is used as the runout characteristic information.

Figure 12:
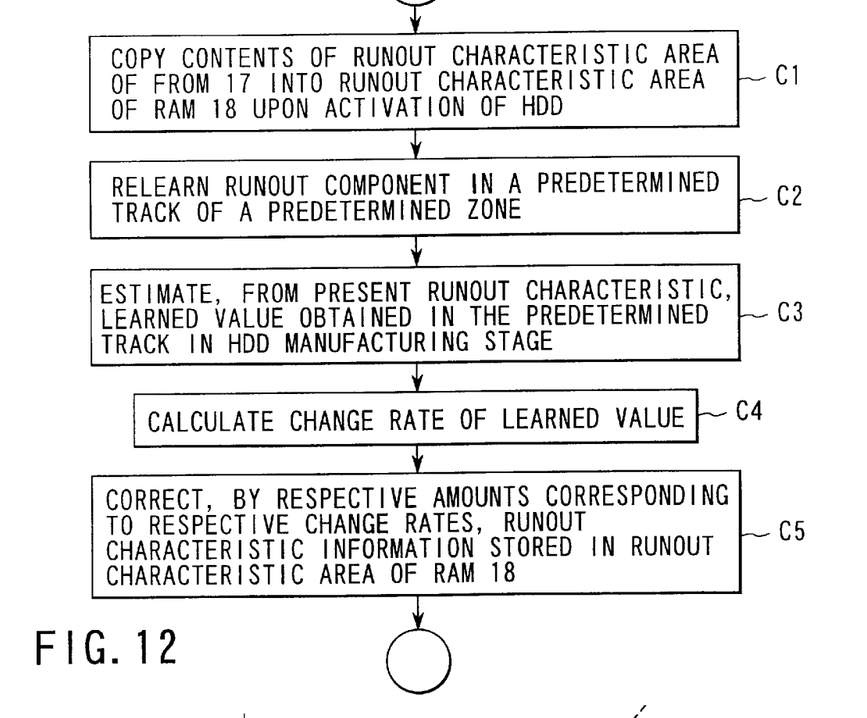
FIG. 12 is a flowchart useful in explaining a process of correcting a learned value in the second modification of the embodiment.

Referring then to the flowchart of FIG. 12, the process of correcting the learned values (initial values) executed in the second modification will be described. Upon activation of the HDD of FIG. 1, the CPU 16 copies, in the runout characteristic area 180b (223b) in the RAM 18 (memory section 223), runout characteristic information for each head stored in the runout characteristic area 170b of the FROM 17 (step C1).

After that, the initial value determining section 224 is activated. As in the first modification, the initial value determining section 224 again executes the learning of the runout component in predetermined track TRs of predetermined zone #s (s is one of 0–3, e.g. 2) on each head #0–#3 of two disks 1 (step C2). Subsequently, the initial value determining section 224 calculates the change rate of the learned value (relearned value) obtained in the zone #s on each head by relearning, in the following manner. First, the initial value determining section 224 estimates a learned value (runout component) in the track TRs on each head during the HDD manufacturing stage on the basis of a runout characteristic (approximation line or curve graph) indicated by runout characteristic information copied into the runout characteristic area 180b (223b) of the RAM 18 (memory section 223) (step C3). Thereafter, the initial value determining section 224 calculates, for each head, the change rate of the aforementioned relearned value to the learned value estimated at the step C3 (step C4).

After calculating the change rate of each learned value for each head, the initial value determining section 224 corrects, by respective amounts corresponding to respective change rates, the runout characteristic information of all heads stored in the runout characteristic area 180b (223b) (step C5). Specifically, supposing that the learned value obtained in predetermined zone #s during the manufacturing stage is represented by x(ns), and the learned value (relearned value) obtained in the predetermined zone #s upon activation of the HDD by xs, the initial value determining section 224 multiplies, by a change rate of xs/x(ns), the runout characteristic (indicated by an approximation line or curve graph) obtained in the HDD manufacturing stage, thereby correcting the runout characteristic. Accordingly, a runout component value obtained in a target track can be corrected more accurately by calculating the runout component value as an initial value on the basis of the corrected runout characteristic. In other words, in the second modification, the use of a runout characteristic for each head enables more accurate correction of a change in runout component due to a change in track position, without increasing the number of zones.

Figure 13:
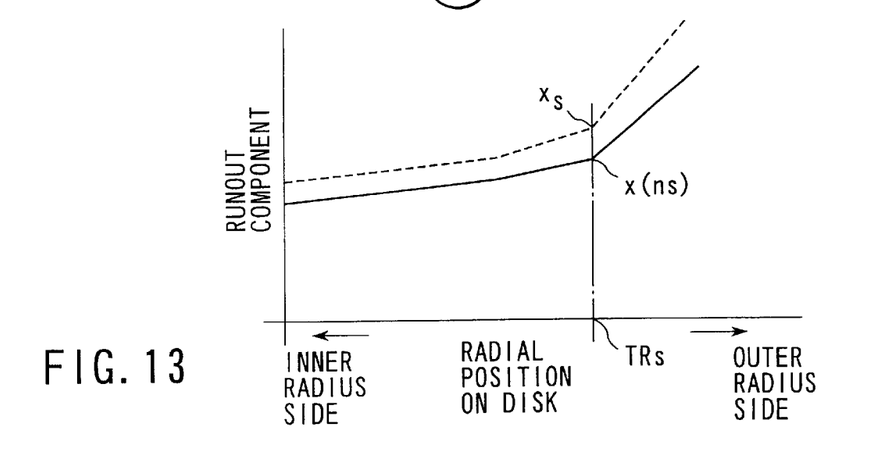
FIG. 13 is a view illustrating the relationship between the runout characteristic before and after correction in the second modification.

FIG. 13 shows the relationship in one head (recording surface) between the runout characteristic before and after correction. In the figure, the solid line indicates the runout characteristic before correction (obtained in the manufacturing stage), while the broken line indicates the corrected runout characteristic (obtained in the HDD activation stage).

Like the first modification, the second modification may employ the following process to secure respective initial value areas in the FROM 17 and the RAM 18 (memory section 223). First, upon activation of the HDD, each learned value (initial value) obtained in the HDD manufacturing stage is copied from the initial value area of the FROM 17 to that of the RAM 18 (memory 223). Then, each learned value obtained in the HDD manufacturing stage and copied into the RAM 18 (memory section 223) is corrected, using a corresponding change rate calculated during the relearning process executed upon activation of the HDD. After that, a runout characteristic is approximated from the corrected learned values, thereby correcting (updating) information stored in the runout characteristic area 180b (223b) on the basis of information indicative of the runout characteristic. If a request for seek control occurs during the track following control, an initial learned value, stored in the memory section 223 and corresponding to the zone in which the head is positioned at present, can be replaced with the latest adaptive learned value obtained by the runout detector 221, as in the above-described embodiment. Moreover, a runout characteristic can be approximated using the updated contents of the memory section 223, thereby correcting (updating) information stored in the runout characteristic area 180b (223b) on the basis of information indicative of the runout characteristic.

Although in the embodiment and its modifications, the present invention is applied to a hard disk drive, it is also applicable to any type of disk drive, such as an optical disk drive and a magneto-optical disk drive, etc., in which head positioning control is executed to situate a head in a target position on a disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for head positioning control that includes seek control, used to move a head to a target position on a disk, and track following control, used to position the head in a target area related to the target position, comprising:

means for detecting a position error between a position of the head and the target position;

means for calculating, from the position error, a feedback value used to eliminate the position error;

adaptive learning means for acquiring, by adaptive learning, a runout component that is included in the position error and synchronous with a rotation of the disk;

means for calculating a feedforward value used to suppress the runout component acquired by the adaptive learning means;

means for generating, from the feedback value and the feedforward value, a control amount used to position the head in the target position;

a rewritable memory to store initial values used in adaptive learning executed by the adaptive learning means, the initial values being values of the runout component obtained in respective predetermined radial positions on the disk; and determination means for selecting, from the memory, one of the initial values, used in adaptive learning by the adaptive learning means, in accordance with the target position, and supplying the selected initial value to the adaptive learning means.

2. The system according to claim 1, wherein the determination means includes means for replacing, when it is necessary, during the track following control, to switch the track following control to the seek control for moving the head to a new target position, one of the initial values stored in the memory, with a latest value of the runout component acquired by the adaptive learning means, the one of the initial values corresponding to a present head position.

3. The system according to claim 1, wherein the determination means includes means for replacing, each time the adaptive learning means acquires a value of the runout component, one of the initial values stored in the memory, with the value of the runout component, the one of the initial values corresponding to a present head position.

4. The system according to claim 1, further comprising control means for causing, upon activation of the disk drive, the adaptive learning means to acquire, by adaptive learning, the values of the runout component in the respective predetermined radial positions on the disk, thereby storing the values of the runout component acquired in the respective predetermined radial positions, in the memory.

5. The system according to claim 1, further comprising:

a nonvolatile memory to prestore the values of the runout component acquired in the respective predetermined radial positions on the disk; and correction means for causing, upon activation of the disk drive, the adaptive learning means to acquire, by adaptive learning, a value of the runout component in a predetermined radial position on the disk, the correction means also estimating the values of the runout component acquired at present in the respective predetermined radial positions on the basis of the value of the runout component acquired by the adaptive learning means in the predetermined radial position, and on the basis of the values of the runout component corresponding to the respective predetermined radial positions, and storing the estimated values of the runout component in the rewritable memory, the values of the runout component corresponding to the respective predetermined radial positions being stored in the nonvolatile memory.

6. The system according to claim 1, wherein the determination means divides the disk into a plurality of zones corresponding to the respective predetermined radial positions on the disk, thereby managing the plurality of zones, selecting, from the memory, a value the runout component corresponding to one of the zones, to which the target position belongs, and using the selected value as one of the initial values.

7. The system according to claim 1, wherein:

the seek control enables one of two heads, which correspond to respective two recording surfaces of the disk, to be moved to the target position, the one of the heads corresponding to one of the recording surfaces, on which the target position exists;

the memory stores, for each of the recording surfaces of the disk, the values of the runout component obtained in the respective predetermined radial positions, the values of the runout component being used as the initial values in adaptive learning executed by the adaptive learning means; and the determination means selects, from the memory, one of the initial values used in adaptive learning executed by the adaptive learning means, the one of the initial values corresponding to the one of the recording surfaces on which the target position exists, and corresponding to the target position.

8. The system according to claim 1, wherein:

the seek control enables one of heads, which correspond to respective recording surfaces of a plurality of disks each including at least one recording surface, to be moved to the target position, the one of the heads corresponding to one of the recording surfaces, on which the target position exists;

the memory stores, for each of the recording surfaces of the disk, the values of the runout component obtained in the respective predetermined radial positions, the values of the runout component being used as the initial values in adaptive learning executed by the adaptive learning means; and the determination means selects, from the memory, one of the initial values used in adaptive learning executed by the adaptive learning means, the one of the initial values corresponding to the one of the recording surfaces on which the target position exists, and corresponding to the target position.

9. A system for head positioning control that includes seek control used to move a head to a target position on a disk, and track following control used to situate the head in a target area related to the target position, comprising:

means for detecting a position error between a position of the head and the target position;

means for calculating, from the position error, a feedback value used to eliminate the position error;

adaptive learning means for acquiring, by adaptive learning, a runout component that is included in the position error and synchronous with a rotation of the disk;

means for calculating a feedforward value used to suppress the runout component acquired by the adaptive learning means;

means for generating, from the feedback value and the feedforward value, a control amount used to situate the head in the target position;

a rewritable memory to store runout characteristic information indicative of the relationship between the runout component and a radial position on the disk, and obtained from values of the runout component obtained in respective predetermined radial positions on the disk; and determination means for estimating a value of the runout component in the target position, on the basis of the target position and the runout characteristic information stored in the memory, and supplying the adaptive learning means with the estimated value of the runout component as an initial value necessary for adaptive learning executed by the adaptive learning means.

10. The system according to claim 9, further comprising control means for causing, upon activation of the disk drive, the adaptive learning means to acquire, by adaptive learning, the values of the runout component in the respective predetermined radial positions on the disk, thereby acquiring the runout characteristic information on the basis of a learning result, and storing the runout characteristic information in the memory.

11. The system according to claim 9, further comprising:

a nonvolatile memory to prestore the runout characteristic information obtained from the values of the runout component in the respective predetermined radial positions on the disk; and correction means for causing, upon activation of the disk drive, the adaptive learning means to acquire, by adaptive learning, a value of the runout component in a predetermined radial position on the disk, the correction means also estimating a runout characteristic indicative of the present relationship between the runout component and a radial position on the disk on the basis of the value of the runout component acquired by the adaptive learning means in the predetermined radial position, and the runout characteristic information stored in the nonvolatile memory, and storing the estimated values of the runout component in the rewritable memory.

12. The system according to claim 9, wherein:

the seek control enables one of two heads, which correspond to respective two recording surfaces of the disk, to be moved to the target position, the one of the heads corresponding to one of the recording surfaces, on which the target position exists;

the memory stores, for each of the recording surfaces of the disk, the runout characteristic information; and the determination means estimates a value of the runout component in the target position on the basis of the target position, and the runout characteristic information which is included in the runout characteristic information stored for each recording surface in the memory, and corresponds to one of the recording surfaces on which the target position exists.

13. The system according to claim 9, wherein:

the seek control enables one of heads, which correspond to respective recording surfaces of a plurality of disks each including at least one recording surface, to be moved to the target position, the one of the heads corresponding to one of the recording surfaces, on which the target position exists;

the memory stores, for each of the recording surfaces of the disk, the runout characteristic information; and the determination means estimates a value of the runout component in the target position on the basis of the target position, and the runout characteristic information which is included in the runout characteristic information stored for each recording surface in the memory, and corresponds to one of the recording surfaces on which the target position exists.

14. A disk drive apparatus comprising:

at least one disk including at least one recording surface;

a rotary actuator that supports at least one head provided corresponding to the at least one recording surface of the at least one disk, and drives the at least one head in a radial direction of the at least one disk, the at least one head being used to read/write data from and into the at least one recording surface; and a head positioning control system configured to drive the rotary actuator to thereby execute seek control to move the at least one head to a target position on the at least one disk, and execute track following control to position the at least one head in a target area related to the target position, including:

means for detecting a position error between a position of the at least one head and the target position;

means for calculating, from the position error, a feedback value used to eliminate the position error;

adaptive learning means for acquiring, by adaptive learning, a runout component that is included in the position error and synchronous with a rotation of the at least one disk;

means for calculating a feedforward value used to suppress the runout component acquired by the adaptive learning means;

means for generating, from the feedback value and the feedforward value, a control amount used to position the at least one head in the target position;

a memory to store values of the runout component, which are obtained in respective predetermined radial positions on the at least one disk and are used as initial values in adaptive learning executed by the adaptive learning means; and determination means for selecting, from the memory, one of the initial values, used in adaptive learning by the adaptive learning means, in accordance with the target position, and supplying the selected initial value to the adaptive learning means.

15. A disk drive apparatus comprising:

at least one disk including at least one recording surface;

a rotary actuator that supports at least one head provided corresponding to the at least one recording surface of the at least one disk, and drives the at least one head in a radial direction of the at least one disk, the at least one head being used to read/write data from and into the at least one recording surface; and a head positioning control system configured to drive the rotary actuator to thereby execute seek control to move the at least one head to a target position on the at least one disk, and execute track following control to position the at least one head in a target area related to the target position, including:

means for detecting a position error between a position of the at least one head and the target position;

means for calculating, from the position error, a feedback value used to eliminate the position error;

adaptive learning means for acquiring, by adaptive learning, a runout component that is included in the position error and synchronous with a rotation of the at least one disk;

means for calculating a feedforward value used to suppress the runout component acquired by the adaptive learning means;

means for generating, from the feedback value and the feedforward value, a control amount used to position the at least one head in the target position;

a memory to store a runout characteristic indicative of the relationship between the runout component and a radial position on the at least one disk, and obtained from values of the runout component obtained in respective predetermined radial positions on the at least one disk; and determination means for estimating a value of the runout component in the target position, on the basis of the target position and the runout characteristic stored in the memory, and supplying the adaptive learning means with the estimated value of the runout component as an initial value necessary for adaptive learning executed by the adaptive learning means.

16. A method of executing head positioning control that includes seek control used to move a head to a target position on a disk, and track following control used to position the head in a target area related to the target position, comprising:

pre-acquiring, by learning, values of a runout component synchronous with a rotation of the disk, in respective predetermined radial positions on the disk;

calculating a feedback value on the basis of a position error between a head position and the target position to thereby eliminate the position error, each time the position error is detected;

acquiring, by adaptive learning, a value of the runout component contained in the position error, at least during the track following control, each time the position error is detected;

selecting an initial value, used in the adaptive learning, from the values of the runout component pre-acquired in the respective predetermined radial positions, in accordance with the target position;

calculating a feedforward value to suppress the runout component acquired by the adaptive learning; and generating, from the feedback value and the feedforward value, a control amount used to position the head in the target position.

17. A method of executing head positioning control that includes seek control used to move a head to a target position on a disk, and track following control used to position the head in a target area related to the target position, comprising:

pre-acquiring, by learning, values of a runout component synchronous with a rotation of the disk, in respective predetermined radial positions on the disk, and extracting a runout characteristic indicative of the relationship between the runout component and a radial position on the disk;

calculating a feedback value on the basis of a position error between a head position and the target position to thereby eliminate the position error, each time the position error is detected;

acquiring, by adaptive learning, a value of the runout component contained in the position error, at least during the track following control, each time the position error is detected;

estimating an initial value, used in the adaptive learning, from the target value and the extracted runout characteristic;

calculating a feedforward value to suppress the runout component acquired by the adaptive learning; and generating, from the feedback value and the feedforward value, a control amount used to position the head in the target position.

* * * * *